(12) United States Patent
Ham (10) Patent No.: US 11,716,221 B2
(45) Date of Patent: Aug. 1, 2023

(54) SWITCHBOARD MANAGEMENT SYSTEM USING RING NETWORK

(71) Applicant: LS ELECTRIC CO., LTD., Anyang-si (KR)

(72) Inventor: Sung Sik Ham, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 133 days.

(21) Appl. No.: 17/432,792

(22) PCT Filed: Jul. 10, 2019

(86) PCT No.: PCT/KR2019/008497
§ 371 (c)(1),
(2) Date: Aug. 20, 2021

(87) PCT Pub. No.: WO2020/171307
PCT Pub. Date: Aug. 27, 2020

(65) Prior Publication Data
US 2022/0006668 A1    Jan. 6, 2022

(30) Foreign Application Priority Data

Feb. 22, 2019  (KR) .................. 10-2019-0021054

(51) Int. Cl.
*H04L 12/46* (2006.01)
*H04L 45/48* (2022.01)
(Continued)

(52) U.S. Cl.
CPC .......... *H04L 12/4604* (2013.01); *H04L 45/48* (2013.01); *H04L 45/66* (2013.01); *H04L 65/40* (2013.01)

(58) Field of Classification Search
CPC ..... H04L 12/4604; H04L 45/48; H04L 45/66; H04L 65/40; H04L 45/12; H04L 12/42; H04L 12/66
(Continued)

(56) References Cited

U.S. PATENT DOCUMENTS

2011/0029687 A1    2/2011  Kirrmann et al.
2014/0156096 A1*   6/2014  Kopp .................. G06Q 10/06
                                                    700/292
(Continued)

FOREIGN PATENT DOCUMENTS

CN         101854282 A      10/2010
CN         107566521 A       1/2018
(Continued)

OTHER PUBLICATIONS

International Search Report for related International Application No. PCT/KR2019/008497 report dated Aug. 27, 2020; (5 pages).
(Continued)

*Primary Examiner* — Kwang B Yao
*Assistant Examiner* — Syed M Bokhari
(74) *Attorney, Agent, or Firm* — K&L Gates LLP (57) ABSTRACT

The present disclosure relates to a system for managing a switchboard using a ring network, including a plurality of switchboards for forming at least one group, a switch for forming a ring network with the plurality of switchboards to receive operation information related to an operation of a device provided in each switchboard from at least one switchboard among the plurality of switchboards, and a monitoring server for receiving the operation information, and it can be applied to other exemplary embodiments.

10 Claims, 5 Drawing Sheets

(51) Int. Cl.
*H04L 45/00* (2022.01)
*H04L 65/40* (2022.01)

(58) Field of Classification Search
USPC .......................................................... 370/404
See application file for complete search history.

(56) References Cited

U.S. PATENT DOCUMENTS

| | | | |
|---|---|---|---|
| 2015/0195099 A1* | 7/2015 | Imes | H04L 12/2827 700/275 |
| 2017/0264560 A1* | 9/2017 | Heine | H04L 12/40182 |
| 2019/0173782 A1* | 6/2019 | Soliman | H04L 12/4637 |

FOREIGN PATENT DOCUMENTS

| | | |
|---|---|---|
| KR | 20070103435 A | 10/2007 |
| KR | 100990736 B1 | 10/2010 |
| KR | 20180029555 A | 3/2018 |
| KR | 101884120 B1 | 8/2018 |

OTHER PUBLICATIONS

Written Opinion for related International Application No. PCT/KR2019/008497 report dated Aug. 27, 2020; (6 pages).

\* cited by examiner

SWITCHBOARD MANAGEMENT SYSTEM USING RING NETWORK

CROSS-REFERENCE TO RELATED APPLICATIONS

The present application is a National Stage of International Application No. PCT/KR2019/008497 filed on Jul. 10, 2019, which claims the benefit of Korean Patent Application No. 10-2019-0021054, filed on Feb. 22, 2019, with the Korean Intellectual Property Office, the entire contents of each hereby incorporated by reference.

FIELD

The present disclosure relates to a system for managing a switchboard using a ring network.

BACKGROUND

In general, the inside of a switchboard is composed of a grid line for connecting power equipment and an electric control device for manually operating a circuit breaker on site. Since such a switchboard has a closed structure for operational safety, a manager resides on site and inspects the inside of a switchboard by opening the door of the switchboard regularly or when necessary. As such, since the manager must reside on site to inspect the inside of a switchboard, there is a problem in that unnecessary manpower is required. In addition, when a problem occurs in any one of the devices inside the switchboard, there is a hassle of opening the door of the switchboard and directly checking the type of the device having the problem in order to confirm the same.

In order to solve this problem, recently, by using a smart switchboard equipped with a display unit, information of various devices inside the switchboard, in particular, the state of the device that needs to be inspected, is displayed on the display unit such that the manager can check the operation information of the devices provided inside the switchboard in real time or periodically without opening the door of the switchboard. In addition, by checking the operation information of the devices provided inside the switchboard through the display unit, it is possible to check the device having a problem even when the door of the switchboard is not opened. However, even if the smart switchboard is used, a problem arises where the manager must still reside on site.

In particular, in the case of such a smart switchboard, one master switchboard is configured in a plurality of switchboards connected via serial communication. In addition, since the master switchboard collects information inside a plurality of switchboards via serial communication and transmits the same to a data collection device, it is suitable for transmitting and receiving small-scale information at low speed. Accordingly, there is a problem in that it is not suitable for application to an electric room and the like, in which a large-scale switchboard is installed.

SUMMARY

The exemplary embodiments of the present disclosure for solving these conventional problems are directed to providing a system for managing a switchboard using a ring network that connects a plurality of switchboards with a ring network to form a backbone network such that even if communication between switchboards is disconnected, the internal operation of the switchboard connected with the ring network can be continuously checked, and it is thereby possible to check the internal operation of a large-scale switchboard at high speed.

Moreover, the exemplary embodiments of the present disclosure are directed to providing a system for managing a switchboard using a ring network that forms a backbone network of a plurality of switchboards through a ring network, and it is possible to check the information of various devices provided inside a plurality of switchboards on the ring network through a monitoring server in real time or periodically.

The system for managing a switchboard using a ring network according to an exemplary embodiment of the present disclosure includes a plurality of switchboards for forming at least one group, a switch for forming a ring network with the plurality of switchboards to receive operation information related to an operation of a device provided in each switchboard from at least one switchboard among the plurality of switchboards, and a monitoring server for receiving the operation information.

In addition, the switchboard further includes a data collection unit for serving as a gateway to build a communication backbone which is the ring network type.

In addition, the switchboard further includes a communication unit for supporting a rapid spanning tree protocol (RSTP).

In addition, at least one switchboard among the plurality of switchboards included in the group collects operation information on at least one device provided inside a plurality of switchboards included in the group.

In addition, the switchboard further includes a display unit for displaying the operation information.

In addition, the system further includes a user terminal for confirming operation information on at least one device provided inside any one of the switchboards via wireless communication with any one switchboard among a plurality of switchboards included in the group.

In addition, the switchboard supports an Ethernet-based optimal route determination algorithm.

In addition, the switchboard further includes a communication unit for communicating with a sensor installed in at least one device provided inside a plurality of switchboards included in the group.

Moreover, the switchboard for forming a ring network according to an exemplary embodiment of the present disclosure includes a communication unit for supporting wireless communication to communicate with a device provided inside the switchboard, a data collection unit for serving as a gateway to build a communication backbone which is the ring network type with a plurality of switchboards included in a group and a switch, a control unit for controlling the data collection unit to collect operation information related to an operation of a device provided inside the switchboard via the communication unit, and to transmit the operation information to a monitoring server through the switch, and a display unit for displaying the operation information collected by the data collection unit.

Moreover, the switchboard for forming a ring network according to an exemplary embodiment includes a communication unit comprising a first communication unit for supporting RSTP to form a ring network with a plurality of switchboards included in a group and a switch, and a second communication unit for supporting wireless communication to communicate with a device provided inside the switchboard, a control unit for controlling the first communication unit to collect operation information related to an operation of a device provided inside the switchboard via the second communication unit, and to transmit the operation information to a monitoring server through the switch, and a display unit for displaying the operation information collected by the control unit.

As described above, the system for managing a switchboard using a ring network according to the present disclosure connects a plurality of switchboards with a ring network to form a backbone network such that even if communication between the switchboards is disconnected, the internal operation of the switchboard connected through the ring network can be continuously checked, and since it is possible to check the internal operation of a large-scale switchboard at high speed, it has an effect of reducing the operating cost of the switchboard.

In addition, the system for managing a switchboard using a ring network according to the present disclosure forms a backbone network of a plurality of switchboards through a ring network, and it is possible to check the information of various devices provided inside a plurality of switchboards on the ring network through a monitoring server in real time or periodically. Thus, since a manager does not necessarily have to reside on site, it has an effect of minimizing manpower waste.

DETAILED DESCRIPTION

Hereinafter, preferred exemplary embodiments according to the present disclosure will be described in detail with reference to the accompanying drawings. The detailed description disclosed below in conjunction with the accompanying drawings is intended to describe exemplary embodiments of the present disclosure and is not intended to represent the only exemplary embodiments in which the present disclosure may be practiced. In order to clearly describe the present disclosure in the drawings, parts irrelevant to the description may be omitted, and the same reference numerals may be used for the same or similar components throughout the specification.

In an exemplary embodiment of the present disclosure, expressions such as "or", "at least one" and the like may indicate one of the words listed together, or a combination of two or more. For example, "A or B" and "at least one of A and B" may include only one of A or B, or both A and B.

Figure 1:
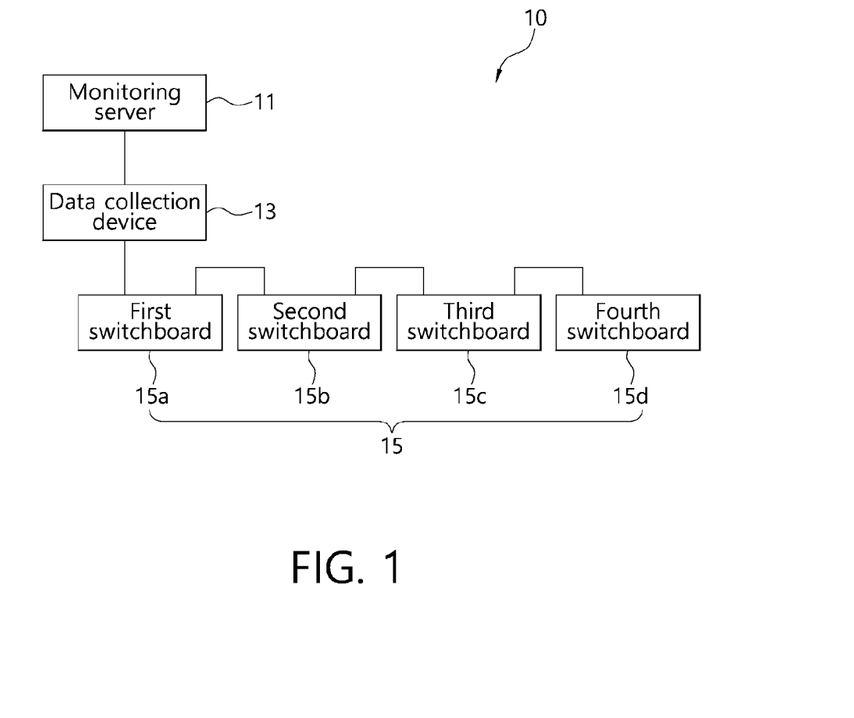
FIG. 1 is a diagram illustrating a system for managing a plurality of switchboards connected via serial communication.

FIG. 1 is a diagram illustrating a system for managing a plurality of switchboards connected via serial communication.

Referring to FIG. 1, a monitoring server 11 is connected to a data collection device 13 to receive operation information of at least one device, for example, power equipment, provided inside a switchboard 15 from the data collection device 13 to monitor the status of the switchboard 15. To this end, the monitoring server 11 performs wired or wireless communication with the data collection device 13, and the monitoring server 11 displays the monitoring result on a display unit (not illustrated).

The data collection device 13 is a remote terminal unit (RTU), which is connected to a first switchboard 15a, which is a master switchboard among a plurality of switchboards 15, and receives operation information of a device provided inside a first switchboard 15a to a fourth switchboard 15d. The data collection device 13 converts data for the collected operation information into a transmittable format and transmits the same to the monitoring server 11.

The first switchboard 15a to the fourth switchboard 15d are connected via serial communication. To this end, each switchboard 15a to 15d includes a communication unit (not illustrated) capable of serial communication. Each switchboard 15a to 15d collects operation information on at least one device provided in each switchboard 15a to 15d. In this case, the first switchboard 15a directly connected to the data collection device 13 may be configured as a master switchboard, and the second switchboard 15b to the fourth switchboard 15d may be configured as slave switchboards.

Accordingly, the fourth switchboard 15d collects the fourth operation information of the device provided in the fourth switchboard 15d and transmits the same to the third switchboard 15c. The third switchboard 13c collects the third operation information of the device provided in the third switchboard 13d and transmits the same to the second switchboard 12b together with the fourth operation information. The second switchboard 12b collects the second operation information of the device provided inside the second switchboard 12b and transmits the same to the first switchboard 12a together with the third operation information and the fourth operation information received from the third switchboard 15c. The first switchboard 15a collects the first operation information of the device provided inside the first switchboard 15a and transmits the same to the data collection device 13 together with the second operation information to the fourth operation information received from the second switchboard 15b.

Accordingly, when at least one communication line among the communication lines connecting each of the first switchboard 15a to the fourth switchboard 15d is disconnected, a problem arises where the monitoring server 11 cannot monitor the status of the switchboard 15. In addition, when at least one communication line among the communication lines connecting each of the first switchboard 15a to the fourth switchboard 15d is disconnected, the disconnected communication line must be restored as soon as possible such that the monitoring of the switchboard 15 is not delayed, and thus, a problem arises where the manager must always reside on site.

Figure 2:
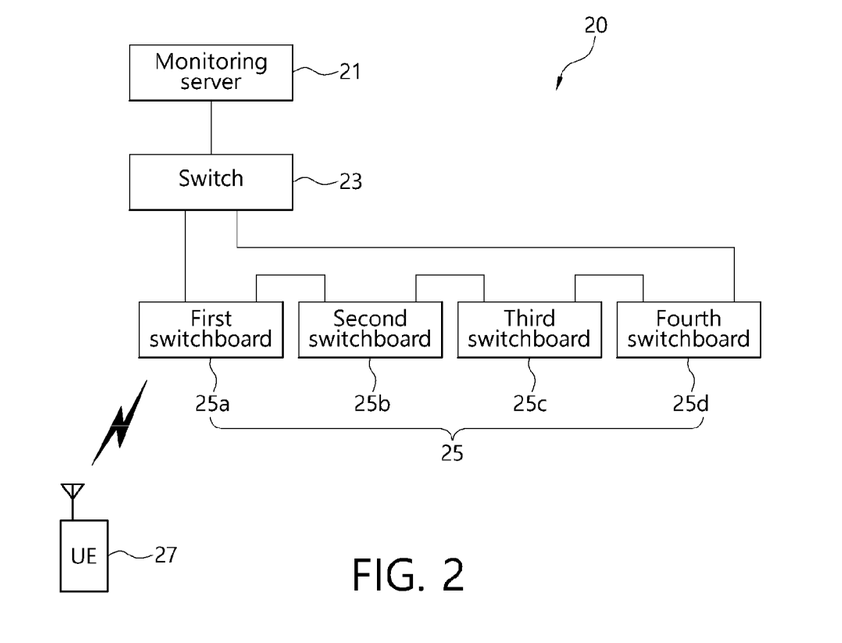
FIG. 2 is a diagram illustrating the system for managing a switchboard using a ring network according to an exemplary embodiment of the present disclosure.

FIG. 2 is a diagram illustrating the system for managing a switchboard using a ring network according to an exemplary embodiment of the present disclosure.

Referring to FIG. 2, the system 20 for managing a switchboard according to the present disclosure includes a monitoring server 21, a switch 23, a plurality of switchboards 25 and a user terminal 27.

The monitoring server 21 is connected to the switch 23 and receives operation information of at least one device, for example, power equipment, provided in the switchboard 25 included in one group from the switch 23 to monitor the status of the switchboard 25. To this end, the monitoring server 21 performs wired or wireless communication with the switch 23, and the monitoring server 21 provides the monitoring result of the switchboard 25 to the manager by displaying the monitoring result on a display unit (not illustrated).

The switch 23 receives operation information of devices provided in a plurality of switchboards 25 from at least one switchboard (e.g., the first switchboard 25a and the fourth switchboard 25d) among the plurality of switchboards 25. The switch 23 transmits the received operation information to the monitoring server 21. To this end, the switch 23 may form a ring network with the plurality of switchboards 25. More specifically, the plurality of switchboards 25 connected to the switch 23 may form one group, and at least one switchboard of the switchboards 25 forming one group (e.g., the first switchboard 25a and the fourth switchboard 25d) may be directly connected to the switch 23. To this end, the switchboard 25 supports a rapid spanning tree protocol (RSTP). Moreover, in an exemplary embodiment of the present disclosure, it is described as an example that the switch 23 communicates with one group including the first switchboard 25a to the fourth switchboard 25d, but is not necessarily limited thereto, and there may be a plurality of groups with which the switch 23 communicates.

In addition, the user equipment (UE) 27 may communicate with at least one switchboard among the plurality of switchboards 25. The user terminal 27 may receive and display operation information of a device provided inside the switchboard 25 that has performed communication. Through this, the manager may check the operation information in switchboard units using the user terminal 27. For example, the manager may position the user terminal 27 close to the second switchboard 25b to check the operation information of the device disposed inside the second switchboard 25b.

Figure 3:
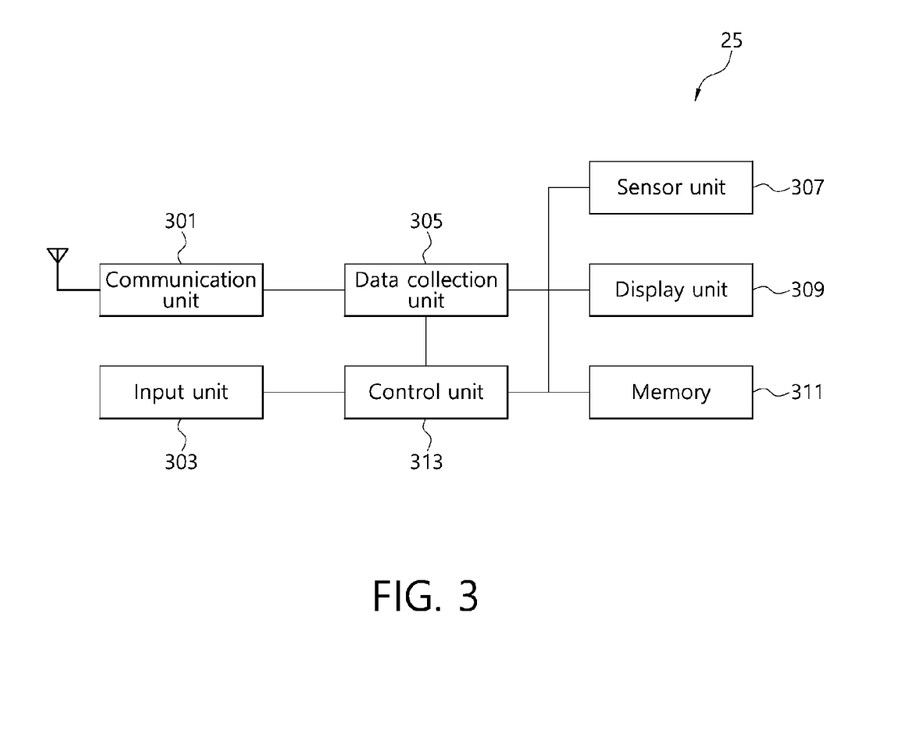
FIG. 3 is a diagram illustrating the main configuration of a switchboard supporting a ring network according to an exemplary embodiment of the present disclosure.
Figure 4:
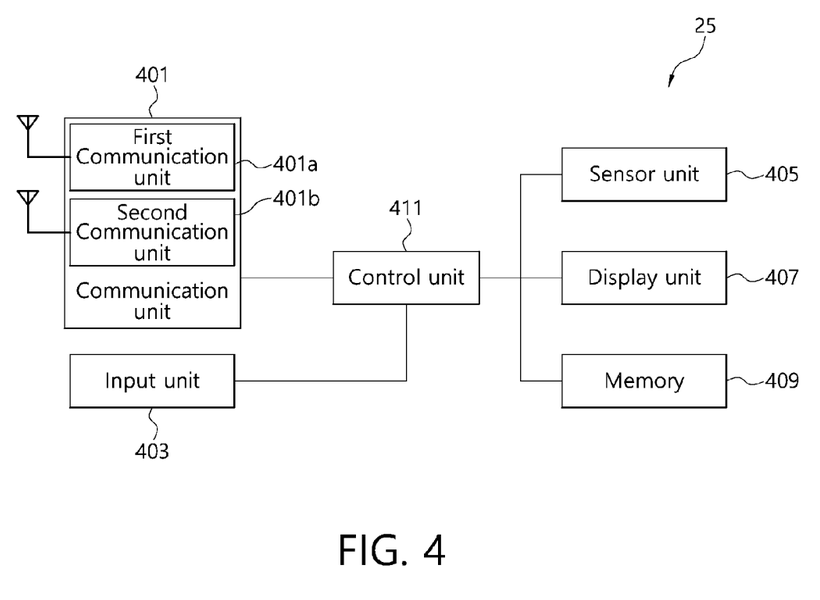
FIG. 4 is a diagram illustrating the main configuration of a switchboard supporting a ring network according to another exemplary embodiment of the present disclosure.

The first switchboard 25a to the fourth switchboard 25d may support RSTP communication to form a ring network with the switch 23. More specifically, the configuration of the switchboard for the first switchboard 25a to the fourth switchboard 25d and the switch 23 to form a ring network will be described with reference to FIGS. 3 and 4 below. FIGS. 3 and 4 are diagrams illustrating the main configuration of a switchboard supporting a ring network according to an exemplary embodiment of the present disclosure.

FIG. 3 is a diagram illustrating the main configuration of a switchboard supporting a ring network according to an exemplary embodiment of the present disclosure.

Referring to FIG. 3, the switchboard 25 according to an exemplary embodiment of the present disclosure includes a communication unit 301, an input unit 303, a data collection unit 305, a sensor unit 307, a display unit 309, a memory 311 and a control unit 313. Moreover, the switchboard illustrated in FIG. 3 will be described with the first switchboard 25a as an example.

The communication unit 301 supports wireless communication for communicating with a device provided inside the switchboard 25a. To this end, the communication unit 301 uses low-power wireless communication such as Zigbee, bluetooth low energy (BLE) and the like to communicate with the device provided inside the switchboard 25a and various sensors provided therein, and may communicate with a user terminal UE using wireless communication such as wireless fidelity (Wi-Fi), long term evolution (LTE), long term evolution advanced (LTE-A), bluetooth and the like.

The input unit 303 generates input data in response to an input of the manager of the switchboard 25a. In this case, the input data may be a command for operating a device provided in the switchboard 25a. The input unit 403 includes at least one input means. To this end, the input unit 403 may include a keypad, a dome switch, a touch panel, a touch key, a button and the like.

The data collection unit 305 serves as a gateway. The data collection unit 305 enables the devices provided in the switchboard 25a to build a communication backbone in the form of Serial to Ethernet and Sensor to Ethernet. In addition, the data collection unit 305 communicates with a data collection unit included in the other switchboards (e.g., the second switchboard 25b to the fourth switchboard 25d) to build a ring network-type communication backbone with other switchboards 25b to 25d and the switch 23.

The data collection unit 305 collects operation information obtained from the sensor unit 307 and transmits the operation information collected under the control of the control unit 313 to the display unit 309 and the switch 23. In addition, when the user terminal UE is connected via the communication unit 301, the data collection unit 305 transmits operation information inside the switchboard 25a to the user terminal UE. The data collection unit 305 may collect operation information of the devices provided inside other switchboards 25b to 25d via communication with the data collection unit included in the other switchboards 25b to 25d. The data collection unit 305 may collectively transmit operation information of the switchboard 25a, in which it is installed, and collected operation information of the other switchboards 25b to 25d to the user terminal (UE), and display the same on the display unit 309.

The sensor unit 307 may be attached to a device provided inside the switchboard 25a to acquire operation information of the device and environmental information inside the switchboard 25a, and in the present disclosure, operation information and environment information are collectively referred to as operation information. To this end, the sensor unit 307 may include sensors such as a temperature sensor and the like, and may include a measurement sensor attached to an electric leak breaker and the like provided inside the switchboard 25a. Moreover, the sensor unit 307 may acquire sensing data for operation information in real time or periodically.

The display unit 309 outputs data according to the operation information of the device provided inside the switchboard 25a. To this end, the display unit 309 may include a liquid crystal display (LCD), a light emitting diode (LED) display, an organic light emitting diode (OLED) display, a micro-electro mechanical system (MEMS) display and an electronic paper display. The display unit 309 may be implemented as a touch screen in combination with the input unit 303.

The memory 311 stores operation programs of the switchboard 25a. More specifically, the memory 311 may store the unique number of a device or sensor provided inside the switchboard 25a, a location where the device or sensor is provided and the like. In addition, the memory 311 may store a multi-port TCP/UDP channel and the like capable of communicating with a plurality of masters. Moreover, the memory 311 may store a 2-channel store-and-through packet switching algorithm with the MAC address assigned to the switchboard 25a, and stores an Ethernet-based optimal route determination algorithm. An example of the method for determining an optimal route using an optimal route determination algorithm will be described in detail with reference to FIG. 5 below.

The control unit 313 controls the overall operation of the switchboard 25a. That is, the control unit 313 controls the data collection unit 305 such that the switchboard 25a may form one group via communication with the data collection unit included in the other switchboards 25b to 25d, and control the data collection unit 305 such that the other switchboards 25b to 25d and the switch 23 form a ring network. In addition, the control unit 313 controls the data collection unit 305 to transmit the operation information obtained from the sensor unit 307 to the display unit 309, and to transmit the operation information to the switch 23.

FIG. 4 is a diagram illustrating the main configuration of a switchboard supporting a ring network according to another exemplary embodiment of the present disclosure.

Referring to FIG. 4, the switchboard 25 according to another exemplary embodiment of the present disclosure includes a communication unit 401, an input unit 403, a sensor unit 405, a display unit 40, a memory 409 and a control unit 411. In addition, the switchboard illustrated in FIG. 4 will be described with the first switchboard 25a as an example.

The communication unit 401 includes a first communication unit 401a for supporting a rapid spanning tree protocol (RSTP) to form a ring network with other switchboards (e.g., the second switchboard 25b to the fourth switchboard 25d) included in a group and a switch 23, and a second communication unit 401b for supporting wireless communication to communicate with a device provided inside the switchboard 25a. More specifically, the first communication unit 401a may be connected to the switch 23 via a communication line supporting RSPT that may be connected to a wired backbone to perform an Ethernet communication.

The second communication unit 401b may communicate with a device provided inside the switchboard 25a and various sensors provided therein via low-power wireless communication such as Zigbee, bluetooth low energy (BLE) and the like, and it may communicate with a user terminal UE via wireless communication using Wi-Fi (wireless fidelity), long term evolution (LTE), long term evolution advanced (LTE-A), bluetooth and the like.

Since the input unit 403, the sensor unit 405, the display unit 407, and the memory 409 perform similar operations as the input unit 303, the sensor unit 307, the display unit 309, and the memory 311 of FIG. 3, detailed descriptions thereof will be omitted. However, in another exemplary embodiment of the present disclosure, since the first communication unit 401a supports RSPT, the data collection unit serving as a gate is not required.

The control unit 411 receives operation information of a device, for example, power equipment, provided inside the switchboard 25a via the second communication unit 401b and displays the same on the display unit 407. In this case, the operation information refers to sensing data received from sensors such as a measurement sensor, a temperature sensor and the like attached to an electric leak breaker and the like. The control unit 411 transmits the received operation information to the switch 23 via the first communication unit 401a to transmit the same to the monitoring server 21.

Based on the operation information received from the switch 23, the manager who manages the monitoring server 21 may efficiently manage energy management and equipment assets by checking the operating status of a circuit breaker provided inside the switchboard 25a, the information of a grid line connecting the devices provided inside the switchboard 25a, the system protection, the self-diagnosis information of the circuit breaker and the like. In addition, when a transmission request signal for operation information is received from the user terminal 27 via the second communication unit 401b, the control unit 411 may transmit the operation information to the user terminal 27.

As such, the present disclosure applies the centralized operation method of a plurality of switchboards 25 forming a group in the monitoring server 21 to monitor all switchboards (the first switchboard 25a to the fourth switchboard 25d) included in the group, and by applying the distributed operation method capable of individually operating each of the plurality of switchboards 25 forming a group in the user terminal UE, it is possible to monitor the switchboard 25.

Figure 5:
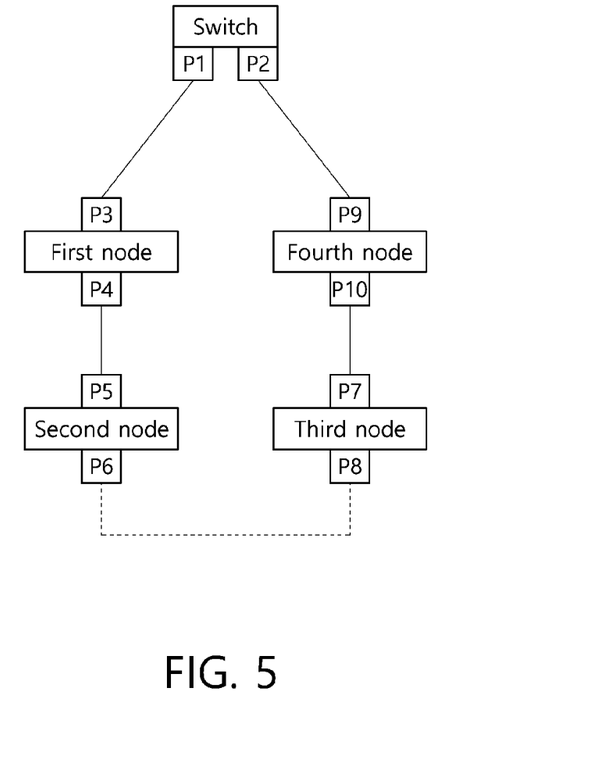
FIG. 5 is a diagram for describing the communication method of a switchboard on a ring network according to an exemplary embodiment of the present disclosure.

FIG. 5 is a diagram for describing the communication method of a switchboard on a ring network according to an exemplary embodiment of the present disclosure.

Referring to FIGS. 2 and 5, the optimal route determination algorithm stored in each of a switch 23 and a plurality of switchboards 25 included in the system 20 for managing a switchboard using a ring network operates as follows. More specifically, when all nodes (the first node to the fourth node, e.g., the first switchboard 25a to the fourth switchboard 25d) including a switch 23 provided in a ring network, to which a rapid spanning tree protocol (RSTP) is applied, are turned on, each node (the first to fourth nodes) including the switch 23 considers itself as a root node and transmits a bridge protocol data unit (BPDU) for RSTP via each port.

For example, the switch 23 transmits BPDU for RSTP to a first node via a first port P1 and transmits BPDU for RSTP to a fourth node via a second port P2. In this case, the BPDU for RSTP includes a root vector value, and the root vector includes a 16-bit integer value called bridge priority and the MAC address of each node. Accordingly, when each node (the first node to the fourth node) including the switch 23 is turned on, a value obtained by combining the bridge priority value set in each node (the first node to the fourth node) and its own MAC address is used as a root vector to transmit BPDU for RSTP.

Afterwards, when the root vector value of BPDU for RSTP received from the adjacent node is smaller than its own root vector value, each node (the first node to the fourth node) including the switch 23 replaces its own root vector value with the root vector value of received BPDU for RSTP, and transmits BPDU for RSTP at every specific time (e.g., Hello Time). On the other hand, when the root vector value of BPDU for RSTP received from the adjacent node is greater than or equal to its own root vector value, each node (the first to fourth nodes) including the switch 23 uses its own root vector value. When this process is repeated, finally, the root vector value of the node having the smallest root vector value is used as the root vector value of each node (the first to fourth nodes) including the switch 23, and the corresponding node is selected as the root node to operate. Moreover, when comparing the root vectors, the bridge priorities are compared first, and the root vector having a smaller bridge priority value is recognized as a new root vector, and if the bridge priorities are the same, the MAC address values are compared, and the root vector having a smaller MAC address is recognized as a new root vector.

For example, when the switch 23 is selected as the root node RN through the above process, each node (the first to fourth nodes) performs cost calculation by substituting the shortest path to the root node (RN) for a link connected to itself, that is, communication lines. In this case, the link with the lowest cost is configured as a root path, and the port to which the corresponding link is connected is configured as a root port. In addition, the other port is configured as a designated port.

That is, since each node (the first node to the fourth node) has two ports P3 to P10, one port becomes the root port P3, P5, P7 and P9, and the other port becomes the designated port P4, P6, P8 and P10. However, all ports P1 and P2 of the root node RN are designated ports. As a result, when the root node RN is configured as the highest node in the ring network, the corresponding ring network may be simplified to a structure having a tree shape.

Each of the designated ports P1, P2, P4, P6, P8 and P10 periodically transmits BPDU for RSTP at every specific time, that is, Hello Time. This BPDU for RSTP includes cost information on the root node (RN) of a designated port for transmitting the same. In this case, the sixth port P6 and the eighth port P8 exchange BPDUs for RSTP with each other, while the designated ports are connected to each other. The sixth port P6 and the eighth port P8 check the received BPDU for RSTP, and the port with a high cost for the root note (RN), for example, the eighth port P8, is changed to serve as an alternative port.

When the port with a high cost for the root node RN is changed to serve as an alternative port, the packet transmission function between the sixth port P6 and the eighth port P8 is deactivated, and a loop is not formed between the sixth port P6 and the eighth port P8. As a result, the ring network becomes a logical tree structure, and all nodes are connected to enable inter-node communication.

Moreover, when the communication line between the first node and the second node is disconnected, the second node determines that the communication line is disconnected if BPDU for RSTP is not received for a certain period of time via the fifth port P5, which is its root port, and considers itself as a root node and performs the root node selection process. In this case, if the BPDU for RSTP is not received at the fifth port P5 for a certain period of time, the BPDU for RSTP is transmitted every Hello Time, for example, once every 2 seconds, and thus, it may mean that the BPDU for RSTP is not received for 3 times or more, that is, 6 seconds or more. Accordingly, the second node may reset the roles of the fifth port P5 and the sixth port P6, after exchanging the BPDU for RSTP with the third node.

Accordingly, the fifth port P5 was a root port, but is changed to a designated port according to the role resetting, and the sixth port P6, which was a designated port, is changed to a root port. Moreover, the remaining nodes including the second node also transmit and receive BPDUs for RSPT according to the root node selection process, and the role of each port may be reset. Finally, when all connection settings of the ring network are reconfigured, the performance of the communication line switching process may be completed. As described above, the system for managing a switchboard according to the present disclosure connects a plurality of switchboards with a ring network to form a backbone network, and thus, it has an effect that even if communication between switchboards is disconnected, the internal operation of the switchboards connected by the ring network may be continuously checked.

The exemplary embodiments of the present disclosure disclosed in the present specification and drawings are only provided as specific examples in order to easily explain the technical contents of the present disclosure and help the understanding of the present disclosure, and are not intended to limit the scope of the present disclosure. Therefore, the scope of the present disclosure should be construed such that in addition to the exemplary embodiments disclosed herein, all variations or modifications derived based on the technical spirit of the present disclosure are included in the scope of the present disclosure.

The invention claimed is:

1. A system for managing a switchboard using a ring network, comprising:
   a plurality of switchboards for forming at least one group;
   a switch for forming a ring network with the plurality of switchboards to receive operation information related to an operation of a device provided in each switchboard from at least one switchboard among the plurality of switchboards;
   a monitoring server for receiving the operation information, wherein:
   each switchboard of the plurality of switchboards and the switch include a first port connected to a first adjacent node of the ring network and a second port connected to a second adjacent node of the ring network in an opposite direction of travel to the first adjacent node on the ring network;
   each given switchboard of the plurality of switchboards identifies one of the first port versus the second port as a root port for forwarding the operation information to the switch by:
     transmitting a first bridge protocol data unit via the first port and a second bridge protocol data unit via the second port in opposite directions through the ring network, wherein each of the first bridge protocol data unit and the second bridge protocol data unit includes a root vector value including a bridge priority value and a media access control (MAC) address for an originating node of the first bridge protocol data unit or the first bridge protocol data unit;
     in response to a receiving, from another switchboard in the ring network, a received root vector value that is smaller than a stored root vector value stored by the given switchboard, replacing the stored root vector value with the received root vector value for use in a subsequent transmission of the first bridge protocol data unit and the second bridge protocol data unit until all nodes of the ring network share an equivalent value in the stored root vector; and
     performing a cost calculation by substituting a shortest path to the switch from he given switchboard for a link connected to the given switchboard that identifies the link as the one of the first port versus the second port for use as the root port.

2. The system of claim 1, wherein each switchboard further comprises:
   a data collection unit for serving as a gateway to build a communication backbone which is the ring network.

3. The system of claim 1, wherein each switchboard further comprises:
   a communication unit for supporting a rapid spanning tree protocol (RSTP).

4. The system of claim 1, wherein at least one switchboard among the plurality of switchboards included in the group collects operation information on at least one device provided inside a plurality of switchboards included in the group.

5. The system of claim 4, wherein each switchboard further comprises:
   a display unit for displaying the operation information.

6. The system of claim 5, further comprising:
   a user terminal for confirming operation information on at least one device provided inside any one of the switchboards of the plurality of switchboards via wireless communication with any one switchboard among the plurality of switchboards included in the group.

7. The system of claim 6, wherein the one switchboard supports an Ethernet-based optimal route determination algorithm.

8. The system of claim 6, wherein each switchboard further comprises:
- a communication unit for communicating with a sensor installed in at least one device provided inside the plurality of switchboards included in the group.

9. A switchboard for forming a ring network, comprising:
- a communication unit for supporting wireless communication to communicate with a device provided inside the switchboard;
- a data collection unit for serving as a gateway to build a communication backbone which is a ring network type with a plurality of switchboards included in a group and a switch;
- a control unit for controlling the data collection unit to collect operation information related to an operation of a device provided inside the switchboard via the communication unit, and to transmit the operation information to a monitoring server through the switch;
- a display unit for displaying the operation information collected by the data collection unit; and
- a first port for connection to a first adjacent node of the ring network and a second port for connection to a second adjacent node of the ring network in an opposite direction of travel to the first adjacent node on the ring network;
- wherein the switchboard is configured to identify one of the first port versus the second port as a root port for forwarding operation information to the switch by:
  - transmitting a first bridge protocol data unit via the first port and a second bridge protocol data unit via the second port in opposite directions through the ring network, wherein each of the first bridge protocol data unit and the second bridge protocol data unit includes a root vector value including a bridge priority value and a media. access control (MAC) address for an originating node of the first bridge protocol data unit or the first bridge protocol data unit;
  - in response to a receiving, from another switchboard in the ring network, a received root vector value that is smaller than a stored root vector value stored by the switchboard, replacing the stored root vector value with the received root vector value for use in a subsequent transmission of the first bridge protocol data unit and the second bridge protocol data unit until all nodes of the ring network share an equivalent value in the stored root vector; and
  - performing a cost calculation by substituting a shortest path to the switch from the switchboard for a link connected to the switchboard that identifies the link as the one of the first port versus the second port for use as the root port.

10. A switchboard for forming a ring network, comprising:
- a communication unit comprising a first communication unit for supporting RSTP to form a ring network with a plurality of switchboards included in a group and a switch, and a second communication unit for supporting wireless communication to communicate with a device provided inside the switchboard;
- a control unit for controlling the first communication unit to collect operation information related to an operation of a device provided inside the switchboard via the second communication unit, and to transmit the operation information to a monitoring server through the switch;
- a display unit for displaying the operation information collected by the control unit; and
- a first port for connection to a first adjacent node of the ring network and a second port for connection to a second adjacent node of the ring network in an opposite direction of travel to the first adjacent node on the ring network;
- wherein the switchboard is configured to identify one of the first port versus the second port as a root port for forwarding operation information to the switch by:
  - transmitting a first bridge protocol data unit via the first port and a second bridge protocol data unit via the second port in opposite directions through the ring network, wherein each of the first bridge protocol data unit and the second bridge protocol data unit includes a root vector value including a bridge priority value and a media access control (MAC) address for an originating node of the first bridge protocol data unit or the first bridge protocol data unit;
  - in response to a receiving, from another switchboard in the network, a received root vector value that is smaller than a stored root vector value stored by the switchboard, replacing the stored root vector value with the received root vector value for use in a subsequent transmission of the first bridge protocol data unit and the second bridge protocol data unit until all nodes of the ring network share an equivalent value in the stored root vector; and
  - performing a cost calculation by substituting a shortest path to the switch from the switchboard for a link connected to the switchboard that identifies the link as the one of the first port versus the second port for use as the root port.

* * * * *